(12) United States Patent
Jambure et al.

(10) Patent No.: US 11,057,496 B2
(45) Date of Patent: Jul. 6, 2021

(54) DISTRIBUTED COMPUTING SYSTEMS HAVING CAPABILITY SERVICES

(71) Applicant: Nutanix, Inc., San Jose, CA (US)

(72) Inventors: Amit Jambure, Bengaluru (IN); Raja Prathyush Kumar Thota, Telangana (IN); Shubham Agrawal, Rajasthan (IN)

(73) Assignee: Nutanix, Inc., San Jose, CA (US)

( * ) Notice: Subject to any disclaimer, the term of this patent is extended or adjusted under 35 U.S.C. 154(b) by 3 days.

(21) Appl. No.: 16/121,857

(22) Filed: Sep. 5, 2018

(65) Prior Publication Data

US 2020/0076920 A1    Mar. 5, 2020

(51) Int. Cl.
  *H04L 29/08*    (2006.01)
  *G06F 9/455*    (2018.01)
  *H04L 12/24*    (2006.01)

(52) U.S. Cl.
  CPC ........ *H04L 67/327* (2013.01); *G06F 9/45558* (2013.01); *H04L 41/082* (2013.01); *H04L 67/34* (2013.01); *G06F 2009/4557* (2013.01); *G06F 2009/45562* (2013.01)

(58) Field of Classification Search
  CPC ..... H04L 67/327; H04L 41/082; H04L 67/34; G06F 9/45558
  USPC .......................................................... 709/220
  See application file for complete search history.

(56) References Cited

U.S. PATENT DOCUMENTS

| 7,395,333 | B1 | 7/2008 | Saulpaugh et al. |
| 8,099,490 | B2 | 1/2012 | Deakin |
| 8,448,185 | B2 | 5/2013 | Nitzsche et al. |
| 8,549,518 | B1 | 10/2013 | Aron et al. |
| 8,601,473 | B1 | 12/2013 | Aron et al. |
| 8,850,130 | B1 | 9/2014 | Aron et al. |
| 9,253,021 | B2 | 2/2016 | Vasseur et al. |
| 9,336,132 | B1 | 5/2016 | Aron et al. |

(Continued)

FOREIGN PATENT DOCUMENTS

CN    106888129 A    6/2017

OTHER PUBLICATIONS

Cano, Ignacio et al. "Curator: Self-Managing Storage for Enterprise Clusters"; University of Washington; published Mar. 2017; pp. all.
Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Meng Vang
(74) *Attorney, Agent, or Firm* — Dorsey & Whitney LLP

(57) ABSTRACT

A device executing an application in a distributed system may transmit a query for capabilities of one or more components in the distributed system to a capability service and receive a response. Based on the response, the device may determine whether a first capability criteria that is based on a first version of the application is met. If the first capability criteria is met, the device may execute the first version of the application. If the first capability is not met: the device may transmit a subscription request to subscribe to one or more particular capabilities; and optionally may determine a second version of the application for which a second capability criteria is met and execute the second version until receiving a notification to the subscription. The capability service may have a capability store that is updated upon a capability change in the one or more components in the system.

40 Claims, 6 Drawing Sheets

(56) References Cited

U.S. PATENT DOCUMENTS

| | | | |
|---|---|---|---|
| 9,652,265 | B1 | 5/2017 | Narayanasamy et al. |
| 9,720,817 | B2 | 8/2017 | Nicol et al. |
| 9,747,287 | B1 | 8/2017 | Bhardwaj et al. |
| 9,747,362 | B2 | 8/2017 | Rangwala et al. |
| 9,772,866 | B1 | 9/2017 | Aron et al. |
| 9,798,578 | B2 | 10/2017 | Grohs et al. |
| 10,181,978 | B1 | 1/2019 | Argenti |
| 2007/0074199 | A1* | 3/2007 | Schoenberg ........ G06F 9/45533 717/168 |
| 2007/0233851 | A1* | 10/2007 | Ma ...................... H04L 67/1008 709/224 |
| 2009/0319580 | A1* | 12/2009 | Lorenz .................... G06F 8/71 |
| 2010/0306759 | A1* | 12/2010 | Kohler ................. G06F 9/4484 717/174 |
| 2012/0042040 | A1 | 2/2012 | Bailey et al. |
| 2012/0131090 | A1 | 5/2012 | Doddavula |
| 2013/0166678 | A1 | 6/2013 | Barak et al. |
| 2013/0166703 | A1* | 6/2013 | Hammer ................ H04L 41/50 709/220 |
| 2014/0223423 | A1* | 8/2014 | Alsina ...................... G06F 8/65 717/173 |
| 2014/0244811 | A1* | 8/2014 | Jacobs .............. H04M 1/72525 709/221 |
| 2015/0195151 | A1 | 7/2015 | Peng et al. |
| 2015/0271276 | A1 | 9/2015 | Edlund et al. |
| 2016/0164722 | A1* | 6/2016 | Zhu ........................ G06F 16/27 709/221 |
| 2016/0246635 | A1* | 8/2016 | Kaplan ..................... G06F 9/50 |
| 2017/0170971 | A1* | 6/2017 | Buendgen .......... H04L 63/0823 |
| 2018/0239793 | A1 | 8/2018 | Bradshaw et al. |
| 2019/0005606 | A1* | 1/2019 | Yang ........................ G06T 1/60 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http:llstevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

DISTRIBUTED COMPUTING SYSTEMS HAVING CAPABILITY SERVICES

TECHNICAL FIELD

This disclosure is related to distributed computing systems, Examples of managing versioning of components in a distributed system are described.

BACKGROUND

Running applications in a distributed computing system may have issues when different versions of an application have different features and different versions may desire different capabilities for nodes in the system. Versioning is used in existing systems, however, it is often assumed that a higher version of an application has all of the features of a lower counterpart. This is not always true. For example, a feature that was available in version 4.6.4 may not be available in 4.7.1 even 4.7.1 may be a higher version that is later developed from a numerical perspective. Further, different features may require different capabilities from one or more nodes in the system. For example, version 2.0 of an application may require each node in the system to have an audio sensor while version 1.0 does not have such requirement. Furthermore, the capabilities of nodes in the system may dynamically be updated as the system adds or removes certain capabilities. For example, in the distributed system, a component may need one or more capabilities from multiple components of the system and these multiple components may occasionally delete/add capabilities. In another example, a service in the system may include multiple instances, each of which is running on a different node. In a partially upgraded system, it is possible that one partition of instances is running an old version and another partition is running a new version. An application may communicate only to those instances which has a particular capability. This makes traditional versioning less scalable.

DETAILED DESCRIPTIONS

Certain details are set forth herein to provide an understanding of described embodiments of technology. However, other examples may be practiced without various of these particular details. In some instances, well-known circuits, control signals, timing protocols, computer system components and/or software operations have not been shown in detail in order to avoid unnecessarily obscuring the described embodiments. Other embodiments may be utilized, and other changes may be made, without departing from the spirit or scope of the subject matter presented here.

Capabilities described herein may include one or more features associated with a device or a service that may allow the device or service to perform certain functions or achieve certain performance. For example, capabilities of a hardware device may include the type of a processor, a graphical process unit (GPU) for performing computations; capabilities of a virtual machine (VM) management service may include a power on/off feature; or capabilities of a communication server may include a compression unit capable of compressing data before transmitting the same.

Components described herein may include a unit or service that may have one or more capabilities for performing certain functions. A component can be hardware-based or software-based. The capabilities of a component may change during the lifetime of the component, and the component may expose its capabilities via an interface. For example, a component may have a new GPU plugged in, and the component may publish its new GPU capability to a capability store, or provide information about the new GPU capability upon receiving a query from another device.

Figure 1:
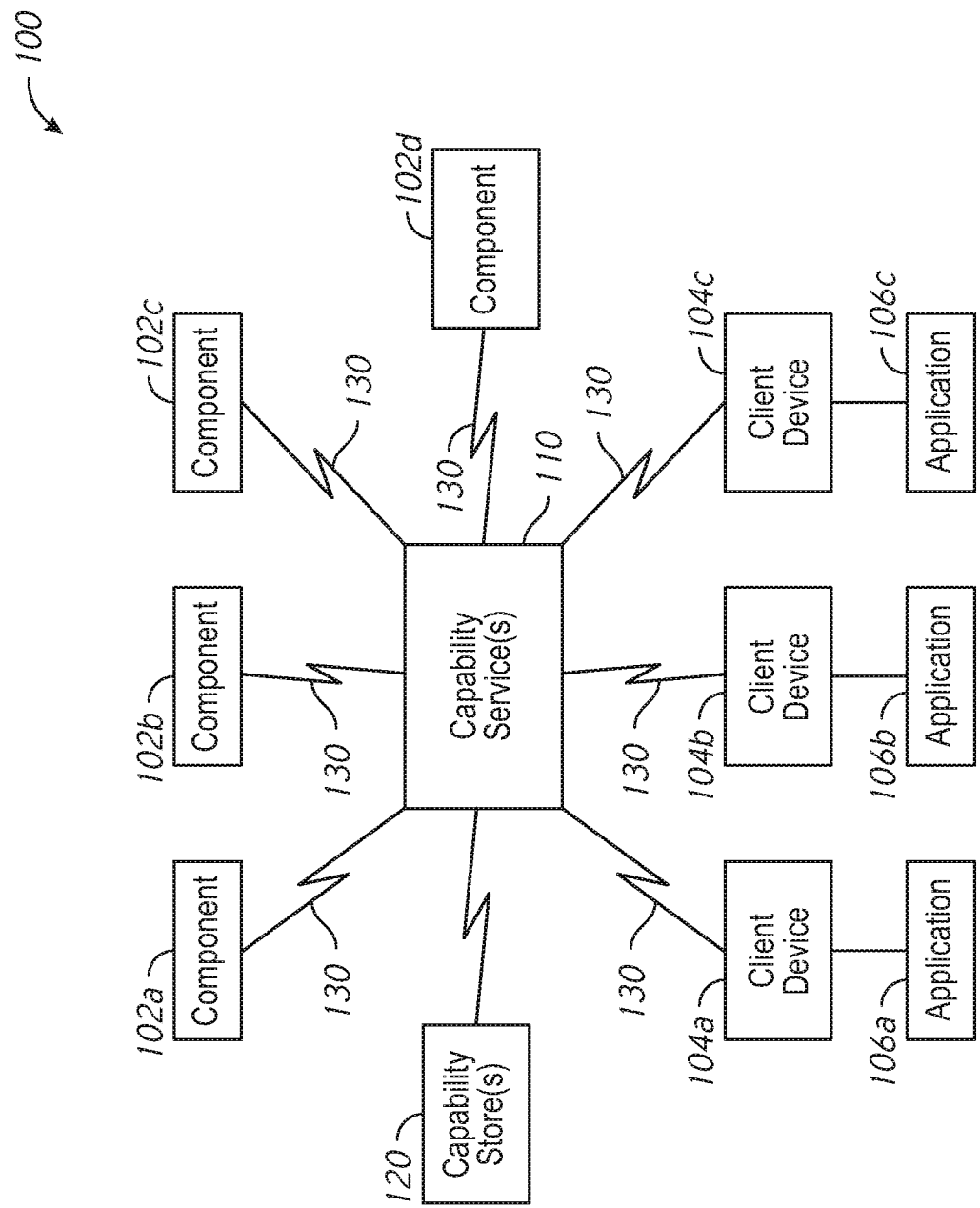
FIG. 1 is a block diagram of an example of a distributed computing system in accordance with examples described herein.

In FIG. 1, a system 100 for managing versioning of components may include one or more components 102a-102d, each component having one or more capabilities. System 100 may also include multiple client devices 104a-104c. Each of the client devices 104a-104c may have one or more applications 106a-106c that are executable on each respective device. In some scenarios, a client device may also include a component. System 100 may also have one or more capability services 110. In some scenarios, the capability service may be a software that is executed on a processing device, e.g., a computing node, a device, a server, or a virtual machine, to perform certain functions. System 100 may also include one or more capability stores 120, each storing capability information for the one or more components. The capability store may be any suitable device or software for storing capability information, such as a memory, a database, or a flat file system.

Capability information in the capability store 120 may be added or updated. In some scenarios, each component in the system may be configured to detect a capability change in the component, e.g., a new capability was added or an existing capability was removed. Upon detecting the capability change, the component may send a publication request to the capability service, or a computing node running the capability service, for publishing the capability change. In response, the capability service may update the content in the capability store based on the capability change. The capability store, the one or more components 102a-102d and the one or more client devices 104a-104c may communicate with each other via a communication network 130. The communication network 130 may be substantially any type or combination of types of communication system for transmitting data either through wired or wireless mechanism (e.g., WiFi, Ethernet, Bluetooth, cellular data, or the like).

In some scenarios, capability service 110 may be configured to: receive a query for capabilities of one or more components in the system. The query may be sent by a client device 104a-104c, which may desire one or more particular capabilities from the one or more components 102a-102d. Alternatively, and/or additionally, the query may be sent by a component in 102a-102d, e.g., which may reside in a device. The component in 102a-102d may desire one or more particular capabilities from other components, e.g., 102a-102d.

In response to the query, capability service 110 may determine the capabilities of one or more components in the system from the capability store 120 and transmit a response to the query with information about the capabilities of the one or more components. Based on the response information about the capabilities of the one or more components, the device may determine whether a capability criteria is met. In some scenarios, the capability criteria is based on a version of an application program. For example, version 1 of an application may read data from a temperature sensor, and a capability criteria may include the installation of a temperature sensor at each component. When the capability criteria is met, the device may execute the application program. When the capability criteria is not met, the device may send a subscription request to the capability service to subscribe to one or more particular capabilities. When the one or more particular capabilities are available at the one or more components, the capability service may send a notification to the device. In the instant example, in which the capability criteria may include the installation of a temperature sensor at each component, a notification is sent by the capability service to the device when each component has a temperature sensor installed.

Capabilities may include examples of characteristics, features, resources, limitations and/or combinations thereof associated with a component or device. For example, capabilities may include the presence and/or absence of a particular sensor or a combination of multiple sensors. The sensors may include, for example, a temperature sensor, a humidity sensor, a vibration sensor, a global positioning system (GPS) sensor, an infrared sensor, a touch sensor, a proximity sensor, a pressure sensor, a level sensor, an ultrasonic sensor, a smoke sensor, a gas sensor, and image or audio sensor. Alternatively, and/or additionally, capabilities may also include the presence and/or absence of a particular component, such as a CPU, a GPU, a flash memory, a particular software component and/or firmware component or a particular software and/or firmware version.

In some non-limiting examples, capabilities may also include capabilities of one or more components, e.g., whether a codec (software or hardware) component supports H.263 compression standard, whether a camera supports a high resolution format, whether a web browser supports Flash or HTML5, the power level of a device. In other non-limiting examples, capabilities may also include the presence/absence of a state of a device, such as, for example, whether a device is on, whether a device has reached a certain power consumption level, whether a temperature sensor has reached a threshold temperature, whether a device is within a certain geographical range or in a proximity of another device. In other non-limiting examples, capabilities may also include whether a component or system has reached a performance criteria. For example, capabilities may include whether a component has above 70 percent up time, whether a traffic system has above 90% on-time rate, whether a component has a down time/up time ratio that is over a threshold. It is appreciated that other variations may also be examples of capabilities.

Figures 2A, 2B:
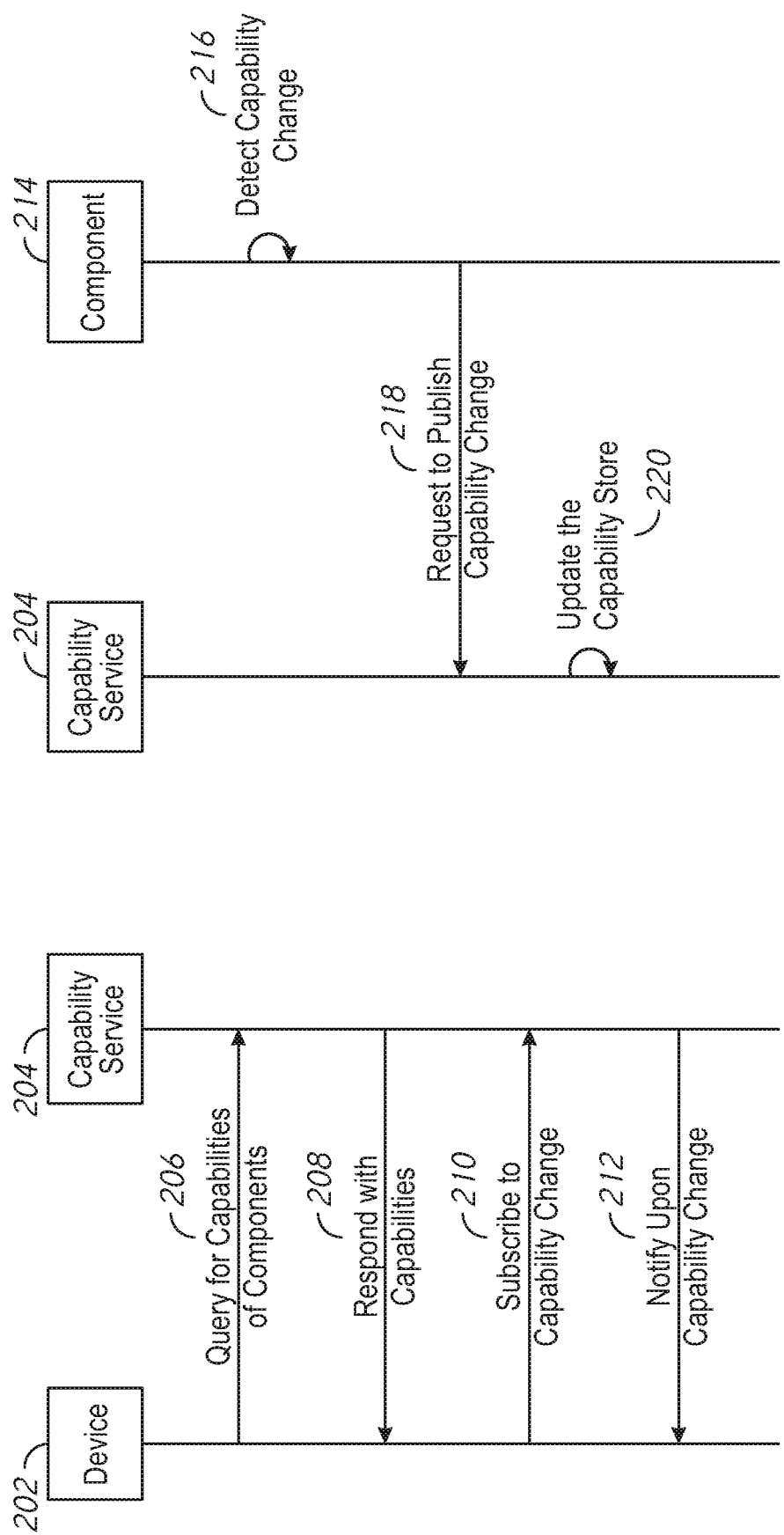
FIGS. 2A and 2B are diagrams illustrating example communications between a device/component and a capability service in accordance with examples described herein.

FIGS. 2A and 2B illustrate example communications between the device and the capability service and communications between the capability service and one or more components.

In FIG. 2A, device 202 which may be executing an application in a system may desire one or more particular capabilities from the one or more components. For example, device 202 may desire that all the components on the network have a GPU in order to run an application. Device 202 may send a query to capability service 204 for capabilities of components 206. The query may include one or more particular capabilities. For example, the particular capability may include GPU availability for extensive computation. Alternatively, and/or additionally, the query may include a request for one or more, or all capabilities of the components in the system. In another non-limiting example, the particular capability may include image sensor availability for capturing image data. In another non-limiting example, the capability may include the availability of an artificial intelligence (AI) engine for performing AI tasks.

In response to the query for capabilities, capability service 204 may determine the capabilities of one or more components in the system from the capability store, and transmit a response to the query with the determined information 208. The response information may include one or more particular capabilities, or all of the capabilities of the one or more components in the distributed system. Device 202 receives the response to the query, and based on the information about the capabilities of the components, determine whether a capability criteria is met. The capability criteria may include a condition that one or more capabilities by a particular version of an application be present in one or more components. For example, the capability criteria may include a condition of whether GPU is installed in all components in the system. In another example, the condition may include that a GPU is available in at least one or more components. When the capability criteria is not met, the device that runs the application may transmit a subscription request to the capability service 210 to subscribe to one or more particular capabilities.

In the above example, the subscription request may include a notification condition, which may include a particular capability, e.g., the availability of GPU. For example, the notification condition may require that at least one component has a particular capability or all of the components on the network have that particular capability. In such a case, capability service 204 may track the capability store and determine whether a change in the capability store has occurred. For example, capability service 204 may determine that a change in the capability store has occurred if one or more components have published a capability change, e.g., an addition or removal of a capability. When a capability change has occurred, the capability service may determine whether the notification condition is met, e.g., one or more particular capabilities are present in at least one or all of the components on the network. When the notification condition is met, capability service 204 may notify device 202.

With reference to FIG. 2B, in some scenarios, capability service 204 may receive from a component 214 a publication request to publish a capability change associated with the component at 218. For example, a component may detect that a capability change has occurred 216, e.g., a new GPU has been installed, and in response to the detection of the new capability, the component may send a publication request to the capability service for publishing the new capability at 218. Upon receiving the publication request, the capability service 204 may publish that capability change (e.g., the addition of GPU) by updating the capability store 220 based on the new capability associated with the component.

Figure 3:
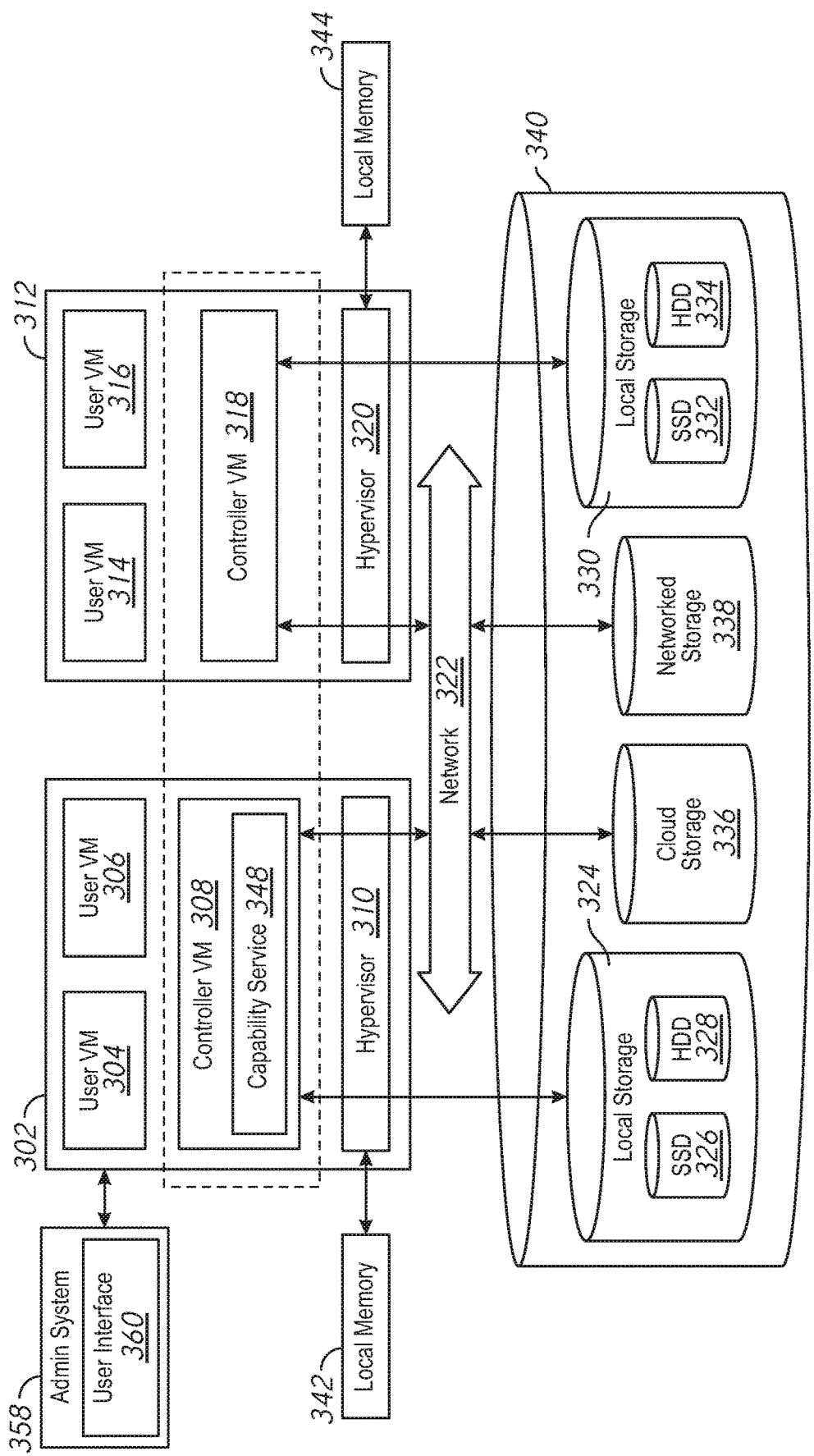
FIG. 3 is a block diagram of a distributing computing system implementing the capability service in FIG. 1.

Various embodiments described herein may be implemented in a distributed system. For example, the capability service may be implemented in a virtual machine over a distributed computing system. In FIG. 3, a distributed computing system generally includes multiple computing nodes 302, 312, and storage 340 connected to a network 322. The network 322 may be any type of network capable of routing data transmissions from one network device (e.g., computing node 302, computing node 312, and storage 340) to another. For example, the network 322 may be a local area network (LAN), wide area network (WAN), intranet, Internet, or a combination thereof. The network 322 may be a wired network, a wireless network, or a combination thereof.

The storage 340 may include local storage 324, local storage 330, cloud storage 336, and networked storage 338. The local storage 324 may include, for example, one or more solid state drives (SSD 326) and one or more hard disk drives (HDD 328). Similarly, local storage 330 may include SSD 332 and HDD 334. Local storage 324 and local storage 330 may be directly coupled to, included in, and/or accessible by a respective computing node 302 and/or computing node 312 without communicating via the network 322. Other nodes, however, may access the local storage 324 and/or the local storage 330 using the network 322. Cloud storage 336 may include one or more storage servers that may be stored remotely to the computing node 302 and/or computing node 312 and accessed via the network 322. The cloud storage 336 may generally include any suitable type of storage device, such as HDDs SSDs, or optical drives. Networked storage 338 may include one or more storage devices coupled to and accessed via the network 322. The networked storage 338 may generally include any suitable type of storage device, such as HDDs SSDs, and/or NVM Express (NVMe). In various embodiments, the networked storage 338 may be a storage area network (SAN). The computing node 302 is a computing device for hosting virtual machines (VMs) in the distributed computing system of FIG. 3. The computing node 302 may be, for example, a server computer, a client device (104a-104c in FIG. 1) or a component (102a-102d in FIG. 1).

The computing node 302 may be configured to execute a hypervisor 310, a controller VM 308 and one or more user VMs, such as user VMs 304, 306. The user VMs including user VM 304 and user VM 306 are virtual machine instances executing on the computing node 302. The user VMs including user VM 304 and user VM 306 may share a virtualized pool of physical computing resources such as physical processors and storage (e.g., storage 340). The user VMs including user VM 304 and user VM 306 may each have their own operating system, such as Windows or Linux. While a certain number of user VMs are shown, generally any suitable number may be implemented. User VMs may generally be provided to execute any number of applications which may be desired by a user.

The hypervisor 310 may be any type of hypervisor. For example, the hypervisor 310 may be ESX, ESX(i), Hyper-V, KVM, or any other type of hypervisor. The hypervisor 310 manages the allocation of physical resources (such as storage 340 and physical processors) to VMs (e.g., user VM 304, user VM 306, and controller VM 308) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 308 and/or controller VM 318, may provide services for the user VMs in the computing node. As an example of functionality that a controller VM may provide, the controller VM 308 may provide virtualization of the storage 340. Accordingly, storage 340 may be referred to as a storage pool. Controller VMs may provide management of the distributed computing system shown in FIG. 3. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging PCI Pass-through in some examples. In this manner, controller VMs described herein may manage input/output (I/O) tests between VMs on a computing node and available storage, such as storage 340.

The computing node 312 may include user VM 314, user VM 316, a controller VM 318, and a hypervisor 320. The user VM 314, user VM 316, the controller VM 318, and the hypervisor 320 may be implemented similarly to analogous components described above with respect to the computing node 302. For example, the user VM 314 and user VM 316 may be implemented as described above with respect to the user VM 304 and user VM 306. The controller VM 318 may be implemented as described above with respect to controller VM 308. The hypervisor 320 may be implemented as described above with respect to the hypervisor 310. In the embodiment of FIG. 3, the hypervisor 320 may be a different type of hypervisor than the hypervisor 310. For example, the hypervisor 320 may be Hyper-V, while the hypervisor 310 may be ESX(i). In some examples, the hypervisor 310 may be of a same type as the hypervisor 320.

The controller VM 308 and controller VM 318 may communicate with one another via the network 322. By linking the controller VM 308 and controller VM 318 together via the network 322, a distributed network of computing nodes including computing node 302 and computing node 312, can be created.

Controller VMs, such as controller VM 308 and controller VM 318, may each execute a variety of services and may coordinate, for example, through communication over network 322. Services running on controller VMs may utilize an amount of local memory to support their operations. For example, services running on controller VM 308 may utilize memory in local memory 342. Services running on controller VM 318 may utilize memory in local memory 344. The local memory 342 and local memory 344 may be shared by VMs on computing node 302 and computing node 312, respectively, and the use of local memory 342 and/or local memory 344 may be controlled by hypervisor 310 and hypervisor 320, respectively. Moreover, multiple instances of the same service may be running throughout the distributed system—e.g. a same services stack may be operating on each controller VM. For example, an instance of a service may be running on controller VM 308 and a second instance of the service may be running on controller VM 318.

Generally, controller VMs described herein, such as controller VM 308 and controller VM 318 may be employed to control and manage any type of storage device, including all those shown in storage 340 of FIG. 3, including local storage 324 (e.g., SSD 326 and HDD 328), cloud storage 336, and networked storage 338. Controller VMs described herein may implement storage controller logic and may virtualize all storage hardware as one global resource pool (e.g., storage 340) that may provide reliability, availability, and performance. IP-based requests are generally used (e.g., by user VMs described herein) to send I/O requests to the controller VMs. For example, user VM 304 and user VM 306 may send storage requests to controller VM 308 using over a virtual bus. Controller VMs described herein, such as controller VM 308, may directly implement storage and I/O optimizations within the direct data access path. Communication between hypervisors and controller VMs described herein may occur using IP requests.

Note that controller VMs are provided as virtual machines utilizing hypervisors described herein—for example, the controller VM 308 is provided behind hypervisor 310. Since the controller VMs run "above" the hypervisors examples described herein may be implemented within any virtual machine architecture, since the controller VMs may be used in conjunction with generally any hypervisor from any virtualization vendor.

Virtual disks (vDisks) may be structured from the storage devices in storage 340, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 308 may expose one or more vDisks of the storage 340 and the hypervisor may attach the vDisks to one or more VMs, and the virtualized operating system may mount a vDisk on one or more user VMs, such as user VM 304 and/or user VM 306.

During operation, user VMs (e.g., user VM 304 and/or user VM 306) may provide storage input/output (I/O) requests to controller VMs (e.g., controller VM 308 and/or hypervisor 310). Accordingly, a user VM may provide an I/O request over a virtual bus to a hypervisor as an iSCSI and/or NFS request. Internet Small Computer system Interface (iSCSI) generally refers to an IP-based storage networking standard for linking data storage facilities together. By carrying SCSI commands over IP networks, iSCSI can he used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File system (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, examples of user VMs described herein may provide storage requests using an IP based protocol, such as SMB. The storage requests may designate the IP address for a controller VM from which the user VM desires I/O services. The storage request may be provided from the user VM to a virtual switch within a hypervisor to be routed to the correct destination. For examples, the user VM 304 may provide a storage request to hypervisor 310. The storage request may request I/O services from controller VM 308 and/or controller VM 318. If the request is to be intended to be handled by a controller VM in a same service node as the user VM (e.g., controller VM 308 in the same computing node as user VM 304) then the storage request may be internally routed within computing node 302 to the controller VM 308. In some examples, the storage request may be directed to a controller VM on another computing node. Accordingly, the hypervisor (e.g., hypervisor 310) may provide the storage request to a physical switch to be sent over a network (e.g., network 322) to another computing node running the requested controller VM (e.g., computing node 312 running controller VM 318).

Accordingly, hypervisors described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

Examples of controller VMs described herein may provide a variety of services e.g., may include computer-executable instructions for providing services). Examples of capability services are described herein, such as capability service 348 of FIG. 3. A single capability service 348 is shown in FIG. 3, although multiple controller VMs in a system may provide capability services (e.g., the controller VM 318 may also have a capability service). In some examples, one instance of the capability service (e.g., capability service 348) may serve as a "lead" service and may provide coordination and/or management of the service across a system (e.g., across a cluster). For example, capability service 348 may communicate with other capability services, and the contents of capability store in the capability service 348 and those in the capability stores of other capability services are synchronized. For example, when a component has requested to publish a capability change, all capability stores in the system will be updated simultaneously with the capability change. In another example, one capability store may be updated with the capability change, and the contents of the capability store are duplicated in all other capability stores in the system.

Examples of systems described herein may include one or more administrator systems, such as admin system 358 of FIG. 3. The administrator system may be implemented using, for example, one or more computers, servers, laptops, desktops, tablets, mobile phones, or other computing systems. In some examples, the admin system 358 may be wholly and/or partially implemented using one of the computing nodes of a distributed computing system described herein. However, in some examples (such as shown in FIG. 3), the admin system 358 may be a different computing system from the virtualized system and may be in communication with a CVM of the virtualized system (e.g., controller VM 308 of FIG. 3) using a wired or wireless connection (e.g., over a network).

Administrator systems described herein may host one or more user interfaces, e.g., user interface 360. The user interface may be implemented, for example, by displaying a user interface on a display of the administrator system. The user interface may receive input from one or more users (e.g., administrators) using one or more input device(s) of the administrator system, such as, but not limited to, a keyboard, mouse, touchscreen, and/or voice input. The user interface 360 may provide input to controller VM 308 and/or may receive data from the controller VM 308 (e.g., from the capability service 348). The user interface 360 may be implemented, for example, using a web service provided by the controller VM 308 or one or more other controller VMs described herein. In some examples, the user interface 360 may be implemented using a web service provided by controller VM 308 and information from controller VM 308 (e.g., from capability service 348) may be provided to admin system 358 for display in the user interface 360.

Administrator systems may have access to (e.g., receive data from and/or provide data to) any number of clusters, including a single cluster or multiple clusters. In the example of FIG. 3, the admin system 358 may receive data from the capability service 348 about the system (e.g., the cluster) shown in FIG. 3, including the utilized capacity of storage 340 over time.

Figure 4:
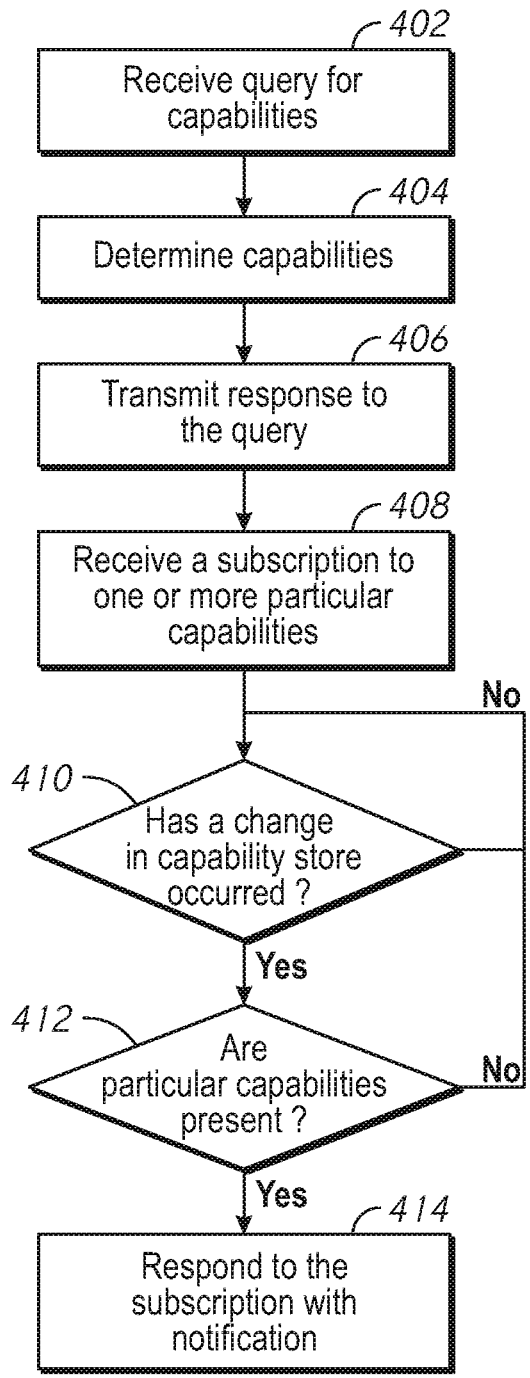
FIG. 4 is a diagram of an example process implemented in a capability service in accordance with examples described herein.

With reference to FIG. 4, a capability service may perform various methods described herein in one or more computing nodes in a distributed computing system (e.g., 302, 312 in FIG. 3). In some examples, a method that can be performed by a capability service may include: receiving a query for capabilities at 402 of one or more components in the system; determining the capabilities at 404 of one or more components in the system from a capability store; and transmitting a response to the query at 406 with information about the capabilities of the one or more components. The query may be sent from a client device running an application program. The query may include requesting all capabilities of the one or more components, or one or more particular capabilities that the application program desires in executing certain functions. In determining the capabilities of one or more components at 404, the method may retrieve information about the capabilities of components from a capability store. In responding to the query, the method may transmit the retrieved information about the capabilities of the components to the device which had sent the query.

In some scenarios, the capability service may receive a subscription request from the device to subscribe to one or more particular capabilities at 408. The capability service will track the capability store. If a change in the capability store has occurred at 410, the capability service may determine whether one or more subscribed particular capabilities are present in the one or more components at 412; otherwise the capability service may repeat tracking the capability store. If the one or more particular capabilities are not present in the one or more components, the capability service may also repeat tracking the capability store. If the one or more particular capabilities are present in the one or more components, then the capability service may respond to the subscription with a notification at 414 in a similar manner as described in FIG. 2A.

Figure 5:
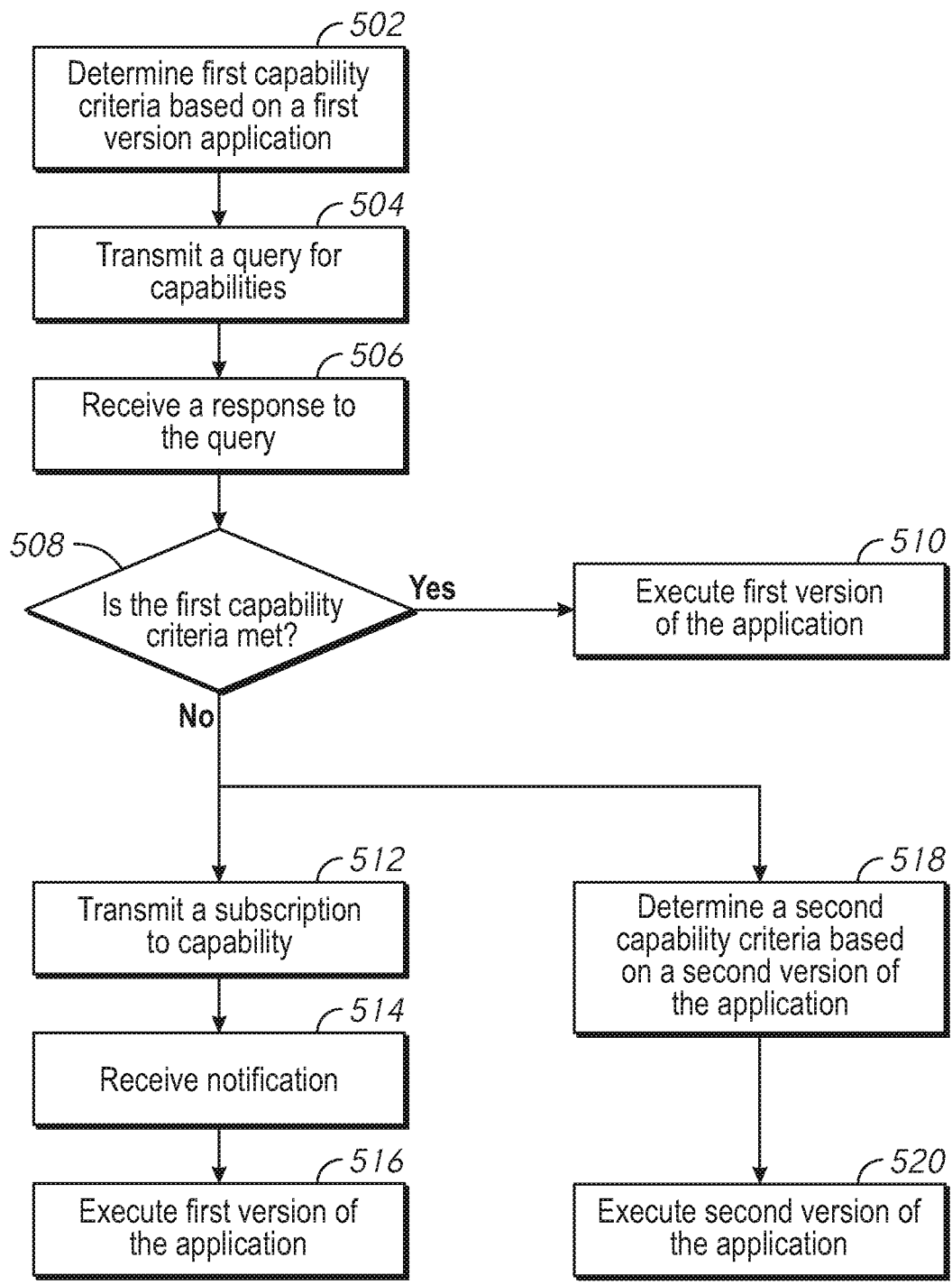
FIG. 5 is a diagram of an example process implemented in a computing node in a distributed system in accordance with examples described herein.

In FIG. 5, in a non-limiting example, a method that is executed by a processor in a device may include determining a first capability criteria based on a first version of an application program at 502, where the first capability criteria includes a condition that one or more capabilities are present in one or more, or in all components. For example, an application may have multiple versions, such as v1.0, v2.0 etc. Each version is associated with a capability criteria that includes particular capabilities for the one or more components on the network. For example, application v2.0, e.g., the first version, requires some computations to be implemented in a GPU, and the first version is associated with a first capability criteria which includes particular capabilities, such as the availability of GPU. The method may transmit a query for the capabilities 504 of the one or more components in the distributed system to a computing node in the distributed computing network. The computing node may be a client device, a component, a virtual machine that has access to a capability service.

With continued reference to FIG. 5, the method may further include: receiving the response to the query at 506 from the computing node; based on the response, determining whether the first capability criteria is met 508. In some scenarios, if at least one or more components on the distributed computing network have GPU available, then the first capability criteria may be met. In other scenarios, if all of the components on the distributed computing network have GPU available, then the first capability criteria may be considered to have been met. In case the first capability criteria is met, the method may execute the first version of the application at 510, for example, application 2.0 may be executed. If the first capability criteria is not met, then application 2.0 may not be executed.

If the first capability criteria is not met, the method may transmit a subscription request to the computing node to subscribe to the one or more particular capabilities at 512 and receive a notification from the computing node at 512, in a similar manner as described in FIG. 2A. The notification may indicate that the first criteria is met, subsequently, the method may execute the first version of the application at 516, e.g., version 2.0.

Additionally, and/or alternatively, when a capability criteria is not met, the application may determine a second capability criteria based on a second version of the application program at 518 so that the second capability criteria is met. For example, the application may be "downgraded" to a different version, e.g., version 1.0, for which an associated criteria, e.g., the second criteria, may be met. In the example above, application v1.0 is associated with a second capability criteria which may not require that a GPU be available, but only require all components on the distributed computing network to have a 64-bit processor. If the response to the query (at 506) indicates that all components have a 64-bit processor, then the second capability criteria is met. In such a case, the method may execute version 1.0 of the application, instead of v2.0. Once the second version of the application is running on the network, it may stay running.

The various embodiments described herein provide advantages over existing systems and methods in managing versioning in a distributed system. For example, with the capability service(s) and capability store(s), e.g., 110, 120 in FIG. 1, version numerals may not be needed. The capabilities desired by each new version of an application may not necessarily be a superset of all capabilities associated with a prior version. Further, the subscription/notification features of the capabillity service facilitates a device to automatically "downgrade" to a version when desired capabilities for a higher version are not available, and switch to a "higher" version when the desired capabilities become available.

Figure 6:
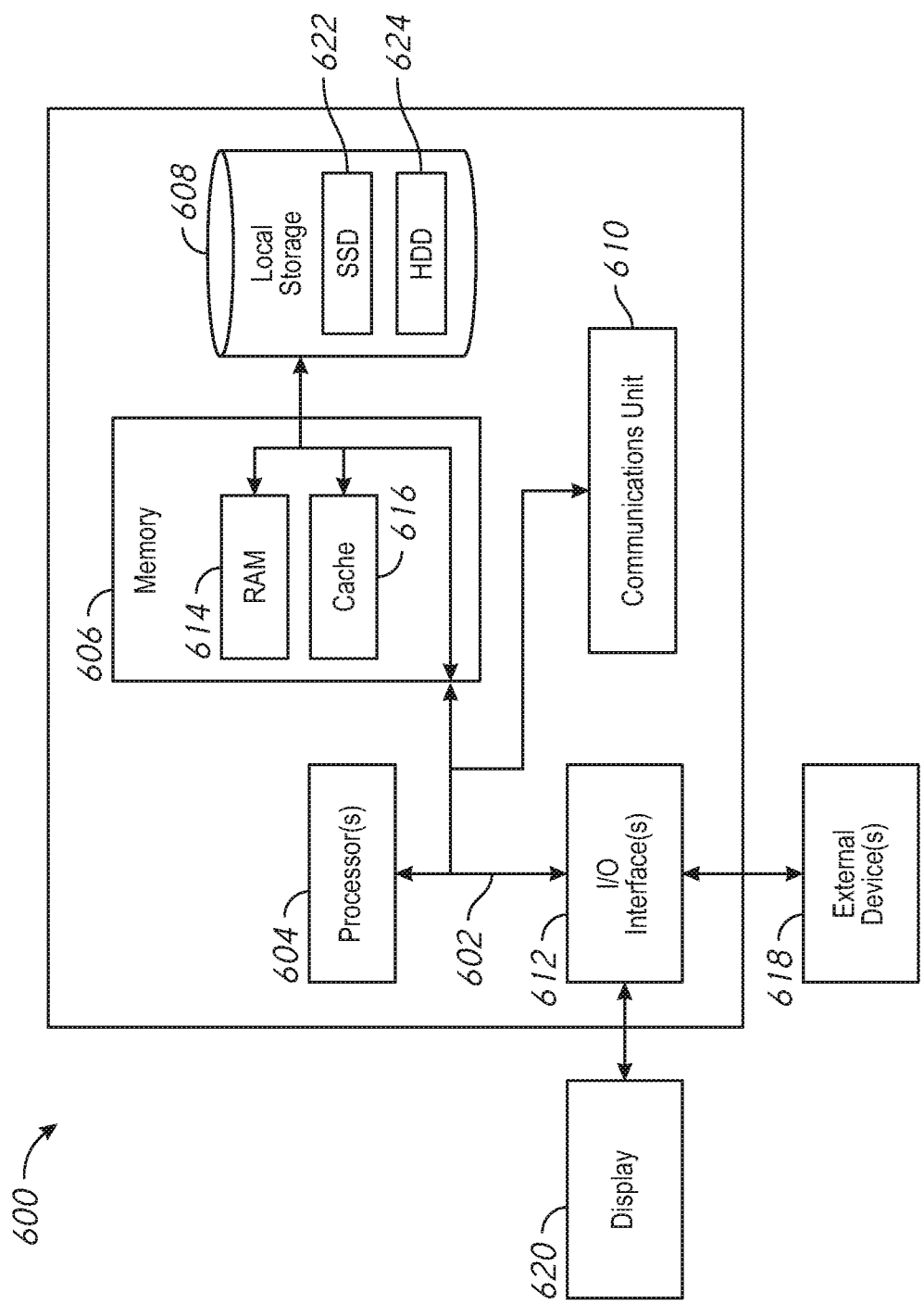
FIG. 6 is a block diagram of components of a computing node in accordance with examples described herein.

FIG. 6 depicts a block diagram of components of a computing node 600 in accordance with examples described herein. It should be appreciated that FIG. 6 provides only an illustration of one implementation and does not imply any limitations with regard to the environments in which different embodiments may be implemented. Many modifications to the depicted environment may be made. The computing node 600 may implemented as the computing node 302 and/or computing node 312, e.g., a client device (104a-104c in FIG. 1), or a component (102a-102d in FIG. 1).

The computing node 600 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media. The local storage 608 may be implemented as described above with respect to local storage 324 and/or local storage 330 in FIG. 3. In this embodiment, the local storage 608 includes an SSD 622 and an HDD 624, which may be implemented as described above with respect to SSD 326, SSD 332 and HDD 328, HDD 334 respectively.

Various computer instructions, programs, files, images, etc. may be stored in local storage 608 for execution by one or more of the respective processor(s) 604 via one or more memories of memory 606. In some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to computing node 600. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present invention can be stored on such portable computer-readable storage media and can be loaded onto local storage 608 via I/O interface(s) 612. I/O interface(s) 612 also connect to a display 620.

Display 620 provides a mechanism to display data to a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

Various functions described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Other examples and implementations are within the scope of the disclosure and. appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications may be made without deviating from the spirit and scope of the present disclosure. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system comprising:
a processor, coupled to memory, and configured for communication with a capability store and a capability service;
the capability store configured to store capabilities of a component, wherein the capabilities comprise features associated with a graphical process unit (GPU), a virtual machine (VM) management service, a communication server, or combinations thereof;
the capability service, included in a virtual machine configured for communication with the processor coupled to memory, the capability service configured to:
receive a query, from a first version of an application program, for capabilities of the component, wherein the query comprises a condition indicative of whether a particular capability of the component is present;
respond to the query with information about the particular capability and the component;
receive a subscription request to subscribe to the particular capability; and
in response to a change in the capability store associated with an addition, a removal, or combinations thereof, of a capability of the component:
determine whether the particular capability is present in the component; and
if the particular capability is present in the component, respond to the subscription request with a notification.

2. The system of claim 1 further comprising an additional capability store associated with an additional virtual machine, wherein content of the capability store and the additional capability store are synchronized.

3. The system of claim 2, wherein the capability store is further configured to:
receive a publication request from a component in the system to publish a capability change associated with the component; and
update the capability store based on the capability change for the component.

4. The system of claim 3, wherein a hypervisor of a computing node associated with the component is configured to:
determine the capability change associated with the component in the system; and
send the publication request to the capability store for publishing the capability change.

5. The system of claim 1, wherein the component is hardware-based.

6. The system of claim 1, wherein the component is software-based.

7. The system of claim 1, wherein the capabilities comprise features associated with GPU availability.

8. The system of claim 1, wherein the capabilities comprise features associated with image sensor availability for capturing image data.

9. The system of claim 1, wherein the capabilities comprise features associated with availably of an artificial intelligence (AI) engine for performing AI tasks.

10. The system of claim 1, wherein the capability service is further configured to track the capability store and determine whether a change in the capability store has occurred.

11. The system of claim 1, wherein the condition indicative of whether GPU availability is present in the component.

12. An apparatus comprising:
a processor; and
at least one non-transitory computer readable medium comprising programming instructions that, when executed, will cause the processor to:
receive a query from a first version of an application program for capabilities of a component, wherein the query comprises a condition indicative of whether a particular capability of the component is present;
transmit the query to a computing node in a distributed system for capabilities of the component in the distributed system, wherein the capabilities comprise features associated with a graphical process unit (GPU), a virtual machine (VM) management service, a communication server, or combinations thereof;
receive a response from the computing node, the response comprising information about the capabilities of the component in the distributed system, including the particular capability;
based on the response, determine whether the particular capability is present in the component; and
if the particular capability is not present in the component:
transmit a subscription request to the computing node to subscribe to the particular capability; and
receive a notification from the computing node in responsive to an occurrence that the particular capability is present in the component.

13. The apparatus of claim 12, wherein the computing node comprises a capability store that stores the information about the capabilities of the component.

14. The apparatus of claim 13, wherein the computing node is a virtual machine in the distributed system.

15. The apparatus of claim 12, wherein programming instructions comprise additional programming instructions that will cause the processor to:
if a first capability criteria comprising the condition indicative of whether the particular capability of the component is present is not met, additionally:
determine a second capability criteria based on a second version of the application program so that the second capability criteria is met; and
execute the second version of the application program;
if the first capability criteria is met, execute the first version of the application program.

16. The apparatus of claim 12, wherein the capabilities comprise a feature associated with GPU availability.

17. The apparatus of claim 12, wherein the capabilities comprise a feature associated with image sensor availability for capturing image data.

18. The apparatus of claim 12, wherein the capabilities comprise a feature associated with availably of an artificial intelligence (AI) engine for performing AI tasks.

19. The apparatus of claim 12, wherein programming instructions comprise additional programming instructions that, when executed, will cause the processor to:
track the computing node and determine whether a change in the computing has occurred.

20. The apparatus of claim 12, wherein the condition indicative of whether GPU availability is present in the component.

21. A method comprising:
receiving a query, from a first version of an application program, for capabilities of a component in a distributed system, wherein the query comprises a condition indicative of whether a particular capability of the component is present, wherein the capabilities comprise features associated with a graphical process unit (GPU), a virtual machine (VM) management service, a communication server, or combinations thereof;
determining the capabilities of the component in the distributed system from a capability store, including the particular capability;
transmitting a response to the query with information about the capabilities of the component;
receiving a subscription request to subscribe to the particular capability; and
in response to a change in the capability store associated with a capability change of the component, wherein the capability change comprises an addition, a removal, or combinations thereof, of a capability of the component:
determining whether the particular capability is present in the component; and
if the particular capability is present in the component, responding to the subscription request with a notification.

22. The method of claim 21 further comprising, by the capability store:
receiving a publication request from a component in the distributed system to publish a capability change associated with the component; and
updating the capability store based on the capability change for the component.

23. The method of claim 22 further comprising:
detecting the capability change associated with the component; and
in response to the detection, sending the publication request to the capability store for publishing the capability change.

24. The method of claim 21 further comprising, by a processor:
transmitting the query for the capabilities of the component in the distributed system to a computing node;
receiving the response from the computing node;
based on the response, determining whether a first capability criteria comprising the condition indicative of whether a particular capability of the component is present is met; and
if the first capability criteria is not met:
(i) transmitting the subscription request to the computing node to subscribe to the particular capability; and
(ii) receiving the notification from thecomputing node.

25. The method of claim 24 further comprising, by the processor:
determining the first capability criteria based on the first version of an application program, wherein the first capability criteria comprises a condition indicative of whether the particular capability of the component is present;
if the first capability criteria is not met, additionally:
determining a second capability criteria based on a second version of the application program so that the second capability criteria is met; and
executing the second version of the application program;
if the first capability criteria is met, executing the first version of the application program.

26. The method of claim 21, wherein the capabilities comprise a feature associated with GPU availability.

27. The method of claim 21, wherein the capabilities comprise a feature associated with image sensor availability for capturing image data.

28. The method of claim 21, wherein the capabilities comprise a feature associated with availably of an artificial intelligence (AI) engine for performing AI tasks.

29. The method of claim 21, wherein the capability service is further configured to track the capability store and determine whether a change in the capability store has occurred.

30. The method of claim 21, wherein the condition indicative of whether GPU availability is present in the component.

31. At least one non-transitory computer readable medium encoded with instructions that, when executed, cause a system to:
receive a query, from a first version of an application program. for capabilities of a component in a distributed system, wherein the query comprises a condition indicative of whether a particular capability of the component is present, wherein the capabilities comprise features associated with a graphical process unit (GPU), a virtual machine (VM) management service, a communication server, or combinations thereof;
transmit a response to the query with information about the capabilities of the component, based on accessing a capability store, including the particular capability;
receive a subscription request to subscribe to the particular capability; and
in response to a change in the capability store associated with a capability change of the component, wherein the capability change comprises an addition, a removal, or combinations thereof, of a capability of the component:
determine whether the particular capability is present in the component; and
if the particular capability is present in the component, respond to the subscription request with a notification.

32. The medium of claim 31 furthercomprising instructions that cause the system to:
receive a publication request from a component in the distributed system to publish a capability change associated with the component; and
update the capability store based on the capability change for the component.

33. The medium of claim 32 further comprising instructions that cause the system to:
detect the capability change associated with the component; and
in response to the detection, send the publication request to the capability store for publishing the capability change.

34. The medium of claim 31 further comprising instructions that cause the system to:
transmit the query for the capabilities of the component in the distributed system to a computing node;
receive the response from the computing node;
based on the response, determine whether a first capability criteria comprising the condition indicative of whether a particular capability of the component is present is met; and
if the first capability criteria is not met:
(i) transmit the subscription request to the computing node to subscribe to the particular capability; and
(ii) receive the notification from the computing node.

35. The medium of claim 34 further comprising instructions that cause the system to:
determine the first capability criteria based on the first version of an application program, wherein the first capability criteria comprises a condition that one or more capabilities are present in the component;

if the first capability criteria is not met, additionally:
   determine a second capability criteria based on a second version of the application program so that the second capability criteria is met; and
   execute the second version of the application program;

if the first capability criteria is met, execute the first version of the application program.

36. The medium of claim 31, wherein the capabilities comprise a feature associated with GPU availability.

37. The medium of claim 31, wherein the capabilities comprise a feature associated with image sensor availability for capturing image data.

38. The medium of claim 31, wherein the capabilities comprise a feature associated with availably of an artificial intelligence (AI) engine for performing AI tasks.

39. The medium of claim 31, wherein the capability service is further configured to track the capability store and determine whether a change in the capability store has occurred.

40. The medium of claim 31, wherein the condition indicative of whether GPU availability is present in the component.

* * * * *

UNITED STATES PATENT AND TRADEMARK OFFICE
CERTIFICATE OF CORRECTION

| | | |
|---|---|---|
| PATENT NO. | : 11,057,496 B2 | Page 1 of 1 |
| APPLICATION NO. | : 16/121857 | |
| DATED | : July 6, 2021 | |
| INVENTOR(S) | : Amit Jambure, Raja Prathyush Kumar Thota and Shubham Agrawal | |

It is certified that error appears in the above-identified patent and that said Letters Patent is hereby corrected as shown below:

In the Specification

| | Reads | Should Read |
|---|---|---|
| Column 6, Line 13 | "input/output (I/0) tests between VMs" | -- input/output (I/0) requests between VMs -- |
| Column 7, Line 36 | "can he used" | -- can be used -- |

In the Claims

| | Reads | Should Read |
|---|---|---|
| Column 15, Line 47 | "receiving the notification from thecomputing node" | -- receiving the notification from the computing node -- |
| Column 16, Line 37 | "The medium of claim 31 furthercomprising" | -- The medium of claim 31 further comprising -- |

Signed and Sealed this
Eighth Day of March, 2022

Drew Hirshfeld
*Performing the Functions and Duties of the
Under Secretary of Commerce for Intellectual Property and
Director of the United States Patent and Trademark Office*